Figure 5:
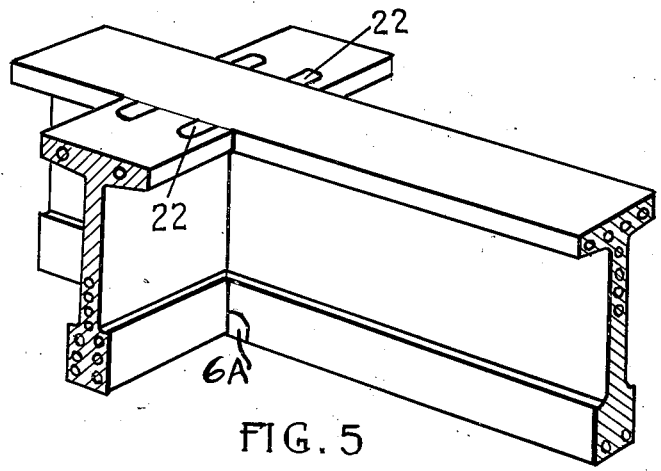

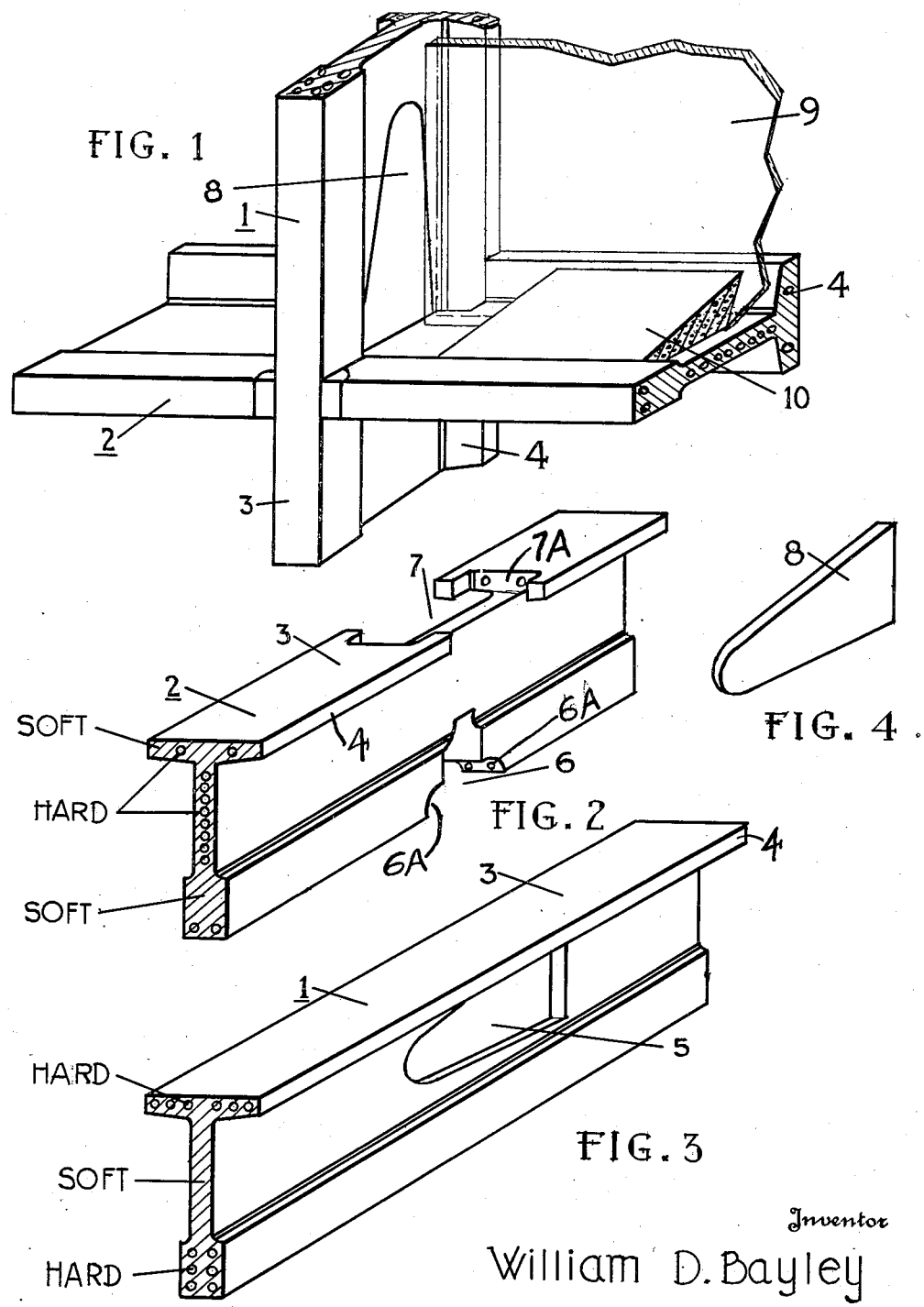

Aug. 24, 1937.  W. D. BAYLEY  2,090,884
INTERLOCKING SASH JOINT
Filed Oct. 9, 1935  2 Sheets-Sheet 2

Inventor
William D. Bayley
By Walker and Downing
His Attorneys

Patented Aug. 24, 1937

2,090,884

UNITED STATES PATENT OFFICE 2,090,884

INTERLOCKING SASH JOINT

William D. Bayley, Springfield, Ohio, assignor to The William Bayley Company, Springfield, Ohio, a corporation of Ohio Application October 9, 1935, Serial No. 44,223

14 Claims. (Cl. 189—76)

This invention relates to interlocking bars and more particularly to interlocking bars to be used in detention window assemblies.

The object of the invention is to provide detention bars and the like that are interlocked and at the same time made from a non-annealable material to permit welding of the bars without weakening to deter the cutting of the bars to effect escape of the inmates.

Another object of this invention is to provide an interlocking joint that does not reduce the dimensions of the hard material used as detention bars.

A further object of the present invention is to provide a bar in which the marginal portion of the bar which is undisturbed is made from hard material and in which the portion containing the eye is made of a softer material, the parts being rigidly secured together.

A further object of this invention is to provide a T-bar the web of which is of hard non-annealable material and the flanges that are cut are made of soft annealable material.

Another object of this invention is to provide detention bars easily manufactured and assembled at a less cost without a sacrifice of quality.

Another object is to provide bars resisting tortion, which shape permits welding to transversely arranged bars, thereby increasing the resistance to tortion, this being augmented by the use of non-annealable material.

Another object is the fabrication of bars for intersection assembly in a manner to provide correct positioning of the bars in assembly relation and at the same time provide crevices for placement of molten welding material.

Another object is to safe-guard against using welding material extending beyond the edges of the bars and thus producing unsightly corners.

With the above primary and other incidental objects in view, as will more fully appear in the specification, the invention consists of the features of construction, the parts and combinations thereof, and the mode of operation, or their equivalents, as hereinafter described and set forth in the claims.

In the drawings, Fig. 1 discloses a fragmentary perspective view of a pair of interlocking bars.

Fig. 2 discloses a fragmentary perspective view of one of the bars, and Fig. 3 discloses a fragmentary perspective view of the complementary bar.

Fig. 4 discloses a key for positively locking the bars in their interengaging position.

Fig. 5 discloses a perspective view of another modification.

Figure 6:
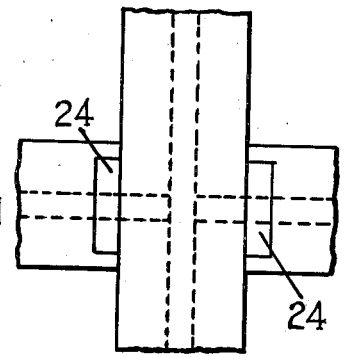
Figure 7:
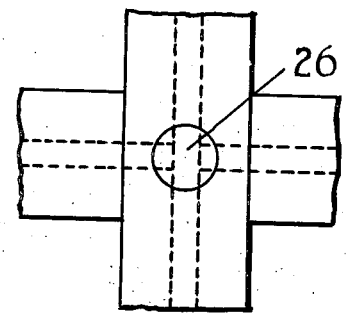
Figure 8:
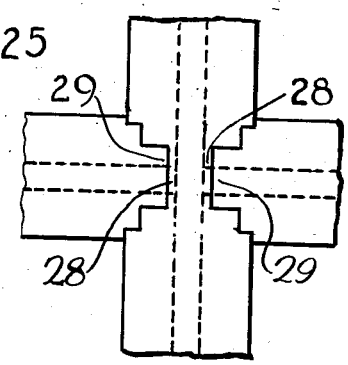

Figs. 6, 7 and 8 disclose plan views of separate modifications.

Figure 9:
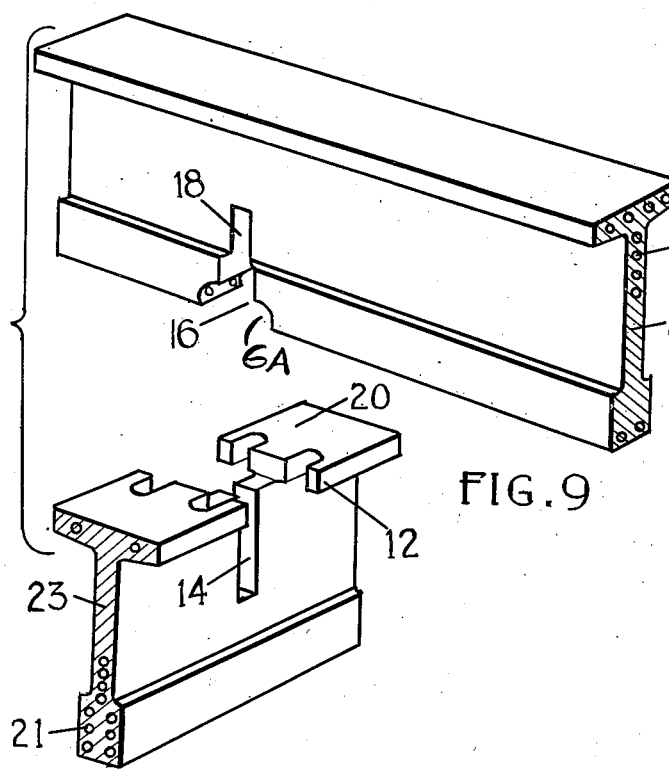

Fig. 9 discloses an exploded view of the modification disclosed in Fig. 5.

In the construction of detention windows it is desirable to eliminate the appearance of the detention bars. Various methods have been proposed and used, some of which concealed the detention bars along the muntin bars. In the modification disclosed herein the detention bars are incorporated into the window assembly with the result that undesirable complexes are avoided in that the detention bars have the appearance of an ordinary window. The material used in ordinary window construction is easily cut and for this reason not suitable as material for detention windows. It has been proposed to make the bars used in the window construction much heavier; but this is objectionable for the reason that the appearance is very massive and thereby may cause undesirable complexes.

In my copending application Serial No. 595,631, filed Feb. 27, 1932, for Detention Window, duo-functional detention and muntin bars have been shown wherein beads of hard material have been welded upon the surface of the bars to deter sawing thereof.

In the present modification the bars having the eyes are provided with flanges of hard material and webs of soft material and the complementary bars have flanges of soft material and the webs of hard material. This construction permits the production of interlocking bars which have longitudinal portions of hard non-annealable material which prevents or hinders the cutting of the bars. This hard material, preferably non-annealable, may be embedded in the bars in the form of strands, the strands throughout the portions of the bars that requires no tooling being lodged close together. In the portions of the bars where it is necessary to do considerable machine work in the manufacture and fabricating of the window assembly, fewer strands may be used per square inch of metal, thereby facilitating the manufacture of the window. In addition to deterring the free use of a saw or other cutting implements in severing the bars, the hard strands are preferably of non-annealable material so as to prevent weakening of the bars when welded together at the intersections. Thus, the bar is equally as strong at and near the intersection as it is throughout the remaining portions of the bar. It seems to be a characteristic of non-annealable material to permit welding without the weakening of this material, whereas annealable material softens when being welded and is thereby weakened.

In constructing a metal window sash by the method herein described, there are employed a series of eye bars 1, spaced apart in parallel relation and a series of needle bars 2 arranged in transverse angular relation with the eye bars 1 and parallel one with the other. Both the eye bars and needle bars are preferably, though not necessarily, of a similar T-shaped cross section. The head or flange 4 of the bars provides ledges or shoulders extending substantially perpendicular to the webs of the bars to form supports for the glass. To provide uniform supports for the glass, it is desirable that the inner or glass engaging faces of the shoulders or ledges of the respective eye and needle bars be flush one with the other and in order that the finished sash shall be of pleasing appearance it is desirable that the outer faces of both the head and web portions of both the eye and needle bar be flush one with the other. Both the eye and needle bar are preferably, though not necessarily, provided with longitudinal flanges 3 upon opposite sides of the web portions extending parallel with the flange or head 4 to form intermediate the flange a channel for putty or other sealing material.

In preparing the bars for interengagement one with the other, the eye bars 1 are provided with deltoidal openings or slots 5 through which the needle bars hereinafter described may be introduced. The opening or eye 5 is of comparatively small proportion, its longitudinal length being substantially equal to the width of the needle bar, while the transverse width of the eye 5 at its widest point is substantially equal to the width of the transverse head 4 of the needle bar. It is to be noted that the eye 5 being longitudinally disposed in the bar leaves a portion of metal of maximum extent undisturbed at each side thereof. There is no distortion or straining of the adjacent portions of the bar and these parts retain their original shape and alignment. After the bar is perforated as shown in Fig. 3, the intermediate deltoidal shaped portion 8 of the material as shown in Fig. 4 is removed. This removed portion of the bar is reserved to be subsequently used as a locking insert to secure the needle bar in its adjusted position. There is thus formed the eye or opening as disclosed in Figs. 1 and 3 while the portion removed appears as shown in Fig. 4.

The flange 3 of the needle bar 2 is provided with a notch or recess 7 sufficiently wide to receive the flanges 3 of the eye bar 1. Welding pockets 7A are also formed, as will appear more fully later. The depth of the notch is substantially equal to the width of the undisturbed portion of the web of the eye bar adjacent to the widest portion of the eye 5. In a position in transverse alignment with the recess or notch 7, the head 4 of the needle bar is cut away as shown at 6 for a distance equal to the width of the head of the eye bar and in addition thereto arcuate welding pockets 6A. There is thus left between the recess 7 and the recess 6 an undisturbed portion of the web of the needle bar substantially equal to the width of the eye 5 of the eye bar at its widest point. To interlock the bars, the needle bar 2 is inserted through the eye or slot 5 of the eye bar 1 with the head 4 of the needle bar engaging the widest portion of the slot or eye until the notch or recess 7 of the needle bar is in registry with the web of the eye bar and the cut away portion of the head 4 of the needle bar is in registry with the head 4 of the eye bar. The needle bar 2 is then rotated throughout a partial revolution causing the separated portion of the head 4 of the needle bar to engage upon opposite sides of the head of the eye bar and the marginal portion of the web of the eye bar to engage within the notch or recess 6 of the needle bar. This revoluble movement is continued throughout substantially a quarter rotation. The needle and eye bar are thus brought to relatively angular positions with the heads 4 and margins of the web of the respective bars flush one with the other, as shown in Fig. 1. The bars are thus interlocked one with the other against independent longitudinal or lateral movement. To lock the bars against disengagement by a return rotation of the needle bar, the insert 8 removed in forming the eye or slot 5 is returned to its position within said slot. The wedge shaped insert is placed in position as shown in Fig. 1 with its apex aligned with the web of the eye bar and its base portion resting against the web of the needle bar, whereupon it may be swaged into position in a plane common with the web of the eye bar by means of a tool. The wedge or deltoidal shape of the insert permits it to driven into the remaining opening, where it serves to clamp the needle bar in its adjusted position. It is obvious that the insert after being replaced in the eye or opening, may be secured by electric or gas welding in a common or well known manner to secure the insert in its position. The glass 9 is permanently secured in position by means of a body 10 of putty or other sealing material located in the channel intermediate the bead 3 and the edge of the glass 9 as shown in Fig. 1.

Thus far the structure described is similar to that disclosed in the Bayley Patent No. 1,136,087 of April 20, 1915. The bars, however, differ from those disclosed in the Bayley patent in that the flanges 3 and 4 in the eye bar are made of a hard tool-proof material that is non-annealable and the web of this bar of a soft material that may be cut or stamped by the ordinary process used in the manufacture of windows. The needle bar, or complementary bar, disclosed in Fig. 2 has a web of hard tool-proof material that is non-annealable and the flanges of a soft toolable material, except for longitudinal strands of hard tool-proof, non-annealable material. By this arrangement the webs of the horizontal bars disclosed in Fig. 1 function as detention bars and the flanges of the vertical bars function as detention bars. This enables the building of the window assembly by the ordinary processes and at the same time produces a detention window assembly.

In addition to the use of the deltoidal insert 8 holding the bars in position, the recesses 6A and 7A are filled with fused metal which welds the bars together. The longitudinal portions of hard, tool-proof, non-annealable material permits the welding of the bars without weakening caused by a softening of the bars if annealable material were used. Tests have shown that bars having at least portions thereof of non-annealable material results in a stronger window assembly when welded, than do bars of annealable material similarly welded. Furthermore, tests have shown that bars made of usual kinds of merchants steel are softened by welding and thereby weakened. This makes the use of non-annealable material highly important in windows of detention kind here presented, which must be welded in order to confine the effect of a torsional attack to the length of bar between oppositely disposed bars.

The use of non-annealable portions results in a window assembly offering great resistance to twisting of the bars and likewise unidirectional forces applied thereto, either continuously or intermittently, applied from either one or both sides of the window assembly. By placing the fusing pockets near the extremes of the relatively wide flanges, the effectiveness of the welds are increased due to the great distance of the weld from the neutral axis.

While the bars 1 and 2 have been herein shown and described as T-shaped in cross section, it is obvious that bars of other shapes as I-shaped, L-shaped or flat bars may be interlocked in the same manner. The only variations necessary for interlocking such different bars is a difference in the outline of the eye 5 and the proportions of the recesses 6 and 7 to correspond with the cross sectional shapes of the bars and properly selecting the longitudinal portions made of a tool-proof, non-annealable material in the respective bars.

The number of strands of non-annealable bars per square inch may vary, that is, the density of strands may vary throughout the bars. Where the demand for non-annealable material is greatest, the density is the greatest.

In the modification disclosed in Figs. 5 and 9, instead of having eye and needle bars, one bar has one flange 12 and half the web 14 cut away to receive the other bar which has its other flange 16 and other half of the web 18 cut away. Suitable fusing pockets 20 are formed in the flange 12 so that when the bars are assembled the pockets 20 may be filled with fused metal as shown at 22. The lower half 21 of the lower bar in Fig. 9 is made of hard non-annealable metal and the upper half 23 of soft metal, except for longitudinal strands of hard non-annealable metal. In the upper bar disclosed in Fig. 9 the lower half 25 is made of soft material, except for longitudinal strands and the upper half 27 of hard material, which permits the making of an interlocked joint without cutting very much hard non-annealable material.

In the modification disclosed in Fig. 6, instead of the pockets 20, rectangular slots 24 have been cut into the flanges that have been notched which provides pockets intermediate the cut end of the flange in one bar and the center of the flange in the other. In the modification disclosed in Fig. 7 a hole is drilled through the center flange for the reception of fused metal to hold the bars in interlocked relation. In the modification disclosed in Fig. 8 the flange that runs throughout the length of the window is provided with notches 28 for receiving the ends 29 of the notched flanges. This permits the use of a single weld.

In each of the above modifications the bars when assembled have very little play and yet sufficient space for uniting the interlocked bars by welding without making the weld on the exterior faces of the bars.

The use of fused metal in the pockets provided therefor interrupts the otherwise open seams between the severed flanges and the unsevered flanges, thereby eliminating an attractive nuisance that formerly suggested a starting point for the saw, emery or whatever cutting implement is available. The fused metal of the welded joints is usually very hard and extremely difficult to cut.

In addition to the foregoing, the use of pockets for the fused welding metal presents a square corner and allows the use of a perfectly flat surface on the face of the bar.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described my invention, I claim:

1. A detention window assembly including a pair of complementary transversely arranged detention bars forming a composite construction, one of said bars including a longitudinal portion of relatively hard tool resisting non-annealable material and another longitudinal portion of relatively soft toolable material, the other bar having oppositely disposed longitudinal portions of hard tool resisting non-annealable material and soft toolable material, portions of the hard tool resisting material of each bar being seated in a cut-away portion of the toolable material in the opposite bar thereby to interlock the bars, at least one of the bars having recesses adjacent the uncut portion of the complementary bar whereby the bars may be welded together, the non-annealable portions retaining the original hardness after being welded.

2. A detention window assembly including a pair of complementary transversely arranged detention bars forming a composite construction, substantially one-half of one of said bars consisting of tool resistant non-annealable material and the opposite half of the other bar consisting of like material, the remaining portion of each bar consisting of relatively softer toolable material, which is provided with a cutout portion permitting interlocking of the bars, without cutting the tool resisting portions of each bar, at least one of said bars being provided with fusing recesses whereby the bars may be welded together below the exposed surfaces so as to prevent an uninterrupted surface when finished, the non-annealable portions retaining the original hardness after being welded.

3. A window assembly including transversely arranged muntin bars forming a composite structure, each of the bars having cutout portions in which uncut portions of the transverse bars are seated in interlocking relation, at least some of said bars having fusing recesses adjacent the uncut portions of the interlocking bars whereby the bars may be welded below the exposed surface to present an uninterrupted surface when finished.

4. A window assembly including a pair of transversely arranged complementary bars interlocked one with the other, each of the bars being composed of characteristically different materials homogeneously united in differently arranged relation including relatively hard margins of tool-proof non-annealable material, and an intermediate integral portion of relatively softer material forming one bar having an eye cut in the intermediate portion and a relatively hard intermediate portion of tool-proof non-annealable material and integral margins of relatively softer material forming the other bar, said margins being cut to receive the hard margins of tool-proof non-annealable material, the bars being held by submerged welds.

5. Complementary detention grille bars including a bar comprising spaced marginal portions formed entirely of hard tool-proof non-annealable material and an intermediate portion formed entirely of relatively softer workable material homogeneously united with the tool-proof non-annealable marginal portions, and a second bar comprising an intermediate longitudinal portion formed of hard tool-proof non-annealable material and relatively spaced marginal portions formed entirely of a relatively softer workable material homogeneously united below the surface with the tool-proof intermediate portion.

6. A detention window assembly including complementary transversely arranged duo-functional muntin and detention bars, said bars being shaped for interlocking engagement in transverse relation and provided with glass receiving rabbets for supporting window panes, each including medial web and marginal flange portions having different characteristics, the margins of one bar being of hard tool resistant non-annealable material and its medial web portion being of softer workable material having an opening therethrough, the margins of the other bar being of workable material having notches and its medial web portion being of tool resistant non-annealable material, the bars being welded below the surface at their juncture.

7. A detention window assembly including a pair of transversely arranged I-shaped complementary duo-functional glass supporting muntin and detention bars shaped for interlocking engagement, one of said bars including spaced longitudinal marginal flange portions shaped to receive window panes and possessing a tool resistant characteristic and being substantially unworkable and an intermediate longitudinal workable web portion having openings therein to receive a complementary bar, and a second bar including a longitudinal medial web portion possessing a tool resistant characteristic and being substantially unworkable and spaced longitudinal workable marginal flange portions shaped to receive window panes having recesses therein to receive the first mentioned bar, the portions of tool resistant characteristics consisting of non-annealable material, the bars being united by submerged welds.

8. A detention window assembly including a pair of complementary transversely arranged detention I-shaped bars forming a composite construction shaped for transverse interlocking engagement with each other, one of said bars including a relatively soft longitudinal web portion subject to cutting action of tools, said web portion having openings cut therein, and relatively hard non-annealable longitudinal flange portions resistant to cutting action of tools disposed at opposite sides of the relatively soft web portion, the other bar including a medial relatively hard non-annealable longitudinal web portion resistant to the cutting action of tools and parallel and longitudinal relatively soft marginal flange portions at opposite sides of the resistant medial web portion responsive of the cutting action of tools, said soft flange portions being notched, said bars being welded below the surface at their juncture, the non-annealable portions retaining their original strength after being welded.

9. In a window assembly, a pair of interlocking muntin bars having recesses for welding the bars together below the outer surface, said bars having complementary portions cut out for the reception of the remaining portion of the other, the uncut portions of the bars having strands of non-annealable material embedded therein so as to retain the original hardness thereof after being welded.

10. In a window assembly, a pair of interlocking muntin bars welded together, said bars having complementary portions removed for the reception of the remaining portion of the other, and recesses for receiving the weld below the outer surface, the uncut portion having strands of non-annealable material embedded therein, the cut portions also having strands of non-annealable material embedded therein, the density of strands in the cut portion being less than the density of strands in the uncut portion, the hardness of said strands remaining substantially the same after being welded as before.

11. In a window assembly, a pair of interlocking duo-functional muntin and detention bars welded together, said bars having complementary cut out portions arranged to abut the remaining portions of the bars, said cut out portions terminating to form subsurface seams extending parallel to the uncut portions of the opposite bar, the metal on at least one side of the seam being non-annealable whereby when the seam is welded to prevent the free passage of a cutting implement between the bars the non-annealable material retains its original hardness.

12. In a window assembly, a pair of interlocking duo-functional muntin and detention bars welded together, said bars having complementary cut out portions leaving opposite portions uncut, the uncut portions including longitudinally extending portions of non-annealable metal and the cut portions including annealable metal more easily machined than the non-annealable portions so that as the seams between the interlocking portions are welded by a subsurface weld to deter the use of severing implements in the seams and to increase the strength of the juncture between the bars, the non-annealable portion retains its original hardness and strength.

13. In a detention window assembly, a pair of interlocking detention and muntin bars one of which is an eye bar and the other a needle bar, each having a web terminating in flanges, the flanges of the eye bar being made entirely of tool-proof non-annealable material harder than the web thereof, the tool-proof margins and relatively softer portions being homogeneously united by a subsurface weld without weakening of the non-annealable portions.

14. In a window assembly, a pair of interlocking detention and muntin bars each having a web terminating in flanges including a needle bar and an eye bar, the web of the needle bar being made entirely of a hard non-annealable material which is harder than the flanges thereof and the flanges of the eye bar being made entirely of hard non-annealable material which is harder than the web thereof, the webs and flanges of the respective bars being homogeneously united by a subsurface weld without weakening of the non-annealable material.

WILLIAM D. BAYLEY.